United States Patent [19]

Hayes

[11] 4,254,906
[45] Mar. 10, 1981

[54] THERMOSTAT WITH SIMULATED HEAT ANTICIPATION

[75] Inventor: Thomas E. Hayes, Goshen, Ind.

[73] Assignee: Johnson Controls, Inc., Milwaukee, Wis.

[21] Appl. No.: 66,485

[22] Filed: Aug. 13, 1979

[51] Int. Cl.³ .................... H01H 35/00; G05D 15/00
[52] U.S. Cl. .............. 236/78 D; 236/68 B; 307/117
[58] Field of Search ................. 236/1 R, 46 F, 46 R, 236/78 D, 68 B; 165/27; 219/492; 307/117

[56] References Cited

U.S. PATENT DOCUMENTS

| 3,942,718 | 3/1976 | Palmieri | 165/26 X |
| 4,193,006 | 3/1980 | Kabat et al. | 328/72 X |

*Primary Examiner*—William E. Wayner

*Attorney, Agent, or Firm*—Emrich, Root, Lee, Brown & Hill

[57] ABSTRACT

The illustrated embodiment is electronic. It includes circuitry for simulating heat anticipation so that in operation, the temperature of the room being heated or cooled does not exhibit excessive overshoot. A signal is generated representative of a desired set point, and another signal is generated representative of room temperature. An output signal, derived from a comparison circuit, is either ON or OFF. An integrator is reset each time the output signal is switched and generates a ramp voltage of increasing magnitude and having a polarity tending to reverse the state of the comparison circuit. The comparison circuit generates an ON signal when the set point signal is greater than the combined temperature and ramp signals; and it generates an OFF signal when the set point signal is less than the combined signals. The comparison circuit latches up once it has switched to avoid hunting or chatter.

16 Claims, 6 Drawing Figures

THERMOSTAT WITH SIMULATED HEAT ANTICIPATION

BACKGROUND AND SUMMARY

The present invention relates to a thermostat; and more particularly, it relates to a thermostat which includes heat anticipation.

It is well known that if a room thermostat were to open its contacts only when the mechanical setting (i.e., the temperature at which the thermostat is set) is reached, the actual temperature of the room would rise well above the mechanical setting and even cause the room to become uncomfortably warm. The reason for this is that when the room temperature reaches the mechanical setting, there is still considerable heat stored in the furnace and duct work, and the blower will continue to deliver this heat to the room after the fuel is shut off. The problem of room temperature overshoot would be even further accentuated because of thermal delays between the ambient temperature of the room being heated and the temperature-sensing element in the thermostat. In other words, the actual temperature-sensing element would reach the mechanical setting long after the ambient temperature of the room reached the mechanical setting. Thus, this delay would cause the room temperature to overshoot even further than that which would be caused only by heat storage in the heating system.

This problem is obviated in a conventional thermostat using a bimetallic temperature sensing element by incorporating a small heater (called the "heat anticipation resistor") adjacent the bimetallic element which generates heat inside the thermostat casing which is conducted directly to the bimetallic element, causing it to switch at the mechanical setting sooner than it otherwise would have switched.

The maximum heat rise of the sensor element due to anticipation heat alone is referred to as the "droop". It is normally of the order of 4° to 5° F. That is to say, if room temperature is at 70° F. and the heat anticipation resistor is continuously energized, but the furnace is not turned on, the temperature of the sensing element will rise approximately four degrees.

The sensing element normally closes at a slightly lower temperature than the temperature at which it opens. The two trip points thus define a hysteresis effect.

In a conventional thermostat of this type, with the trip points centered on the total rise due to anticipation heat alone, the thermostat will have a duty cycle of approximately fifty percent. That is, the contacts will be closed fifty percent of the time and open fifty percent of the time, with no change in room temperature. Further, the thermostat will go through a complete cycle four to six times per hour.

A small change in the room temperature will change the duty cycle of the thermostat contacts over a wide range. That is, for a small decrease in room temperature, the "on" time (when the thermostat contacts are closed) will increase. If the room temperature changes more than one-half of the droop, the thermostat locks on. That is, anticipation heat alone will not cause the contacts to open, the room temperature must also increase.

It would be desirable to have a thermostat with a solid state sensor element as the temperature sensor, doing away with the bimetallic element of current mechanical thermostats. In addition to the low cost and reliability of solid state circuit elements, such a thermostat could be used in controlling the heating or cooling of individual rooms or spaces in a large building, using a central source of heating or cooling, and perhaps incorporating a central computer to facilitate time-of-day programming of temperature for energy conservation. For example, different set points could be stored for different areas in the computer, and changed at different times of the day, taking into account the position of the sun or other environmental factors. However, a simple on/off type of electrical sensor would not have the desirable characteristics of a mechanical thermostat equipped with heat anticipation, as described above.

The embodiments of the present invention are suitable for such systems as well as for direct replacement of conventional mechanical thermostats.

In one embodiment, the sensing element is connected in a bridge circuit, and a signal is generated which is inversely related to temperature. A second signal is generated representative of the set point. These two signals are summed in a comparator circuit. An integrator responsive to the output of the comparator circuit feeds a third signal to be summed with the temperature and set point signals. A fourth signal provides positive feedback to the comparator as a latching signal at the time of output signal change so that once the comparator switches, it remains stable at least until one or the other inputs changes. If the algebraic sum of the signals is greater than a reference voltage (which may be zero volts), the comparator generates an ON signal which may be used to actuate a heat controller. If the algebraic sum of the signals is less than zero, the comparator generates an OFF signal for turning off the heat controller. In operation, if the set point is increased to switch the comparator circuit, the integrator will be initialized to a zero output signal and feed back to the summing circuit a signal having a polarity of opposite sense to that of the set point signal. This integrator feedback signal will increase in magnitude according to a predetermined time constant defined by the integrator. If the set point has been raised only slightly, eventually the output of the integrator will overcome the increase in the set point signal and latching signal, and the output of the comparator will switch to its complementary state, thereby shutting the furnace off. The same effect would have been had if the temperature in the room had decreased to the point where the summed signals would have caused the comparator to change states.

In a second embodiment, the temperature sensing element and the set point signal generator (which may be a variable resistor) are connected in the same bridge circuit, but the overall system operation is the same. The latching comparison function may also be performed mechanically, as with a balance relay.

The present invention thus provides a thermostat capable of using solid state or semiconductor temperature sensors, yet which exhibits the desirable heat anticipation features of present mechanical thermostats.

Other features and advantages of the present invention will be apparent to persons skilled in the art from the following detailed description of a preferred embodiment accompanied by the attached drawing wherein identical reference numerals will refer to like parts in the various views.

DETAILED DESCRIPTION

Figure 1A:
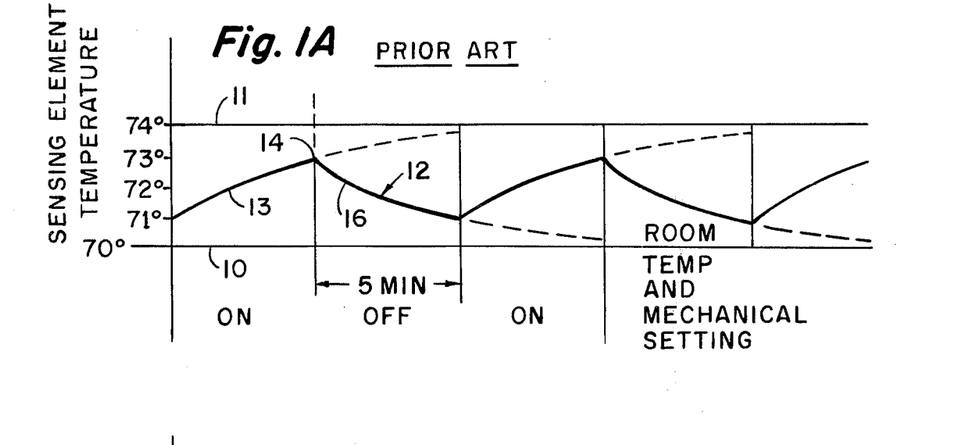
FIGS. 1A and 1B are graphs illustrating the heat anticipation function of a thermostat in general.

Referring first to FIG. 1A, the abscissa of the graph is time, and the ordinate is temperature in °F. In this illustration, reference numeral 10 represents the lower limit of a range, the upper limit of which is 74° indicated by horizontal line 11. This range, sometimes referred to as the "droop" range represents the maximum temperature rise above room temperature that can be effected by the heat anticipation resistor (4° F.). The curve 12 represents the temperature of a sensing element provided with a heat anticipation resistor for the idealized case where the room temperature remains constant and equals the mechanical setting of the thermostat (in this case, 70° F.).

Assuming that the room temperature remains constant and that a furnace or heat controller is not switched on, the trip points of the thermostat are 71° and 73° respectively. That is, the contacts of the thermostat open at 73° and close at 71°. During the rising portion of the curve, indicated by the segment 13, the contacts are closed, thereby energizing the heat anticipation resistor, and causing the temperature of the sensing element to increase according to the curve segment 13. When the temperature of the sensing element increases to 73° F. as indicated at the point 14, the contacts open, thereby removing power from the heat anticipation resistor, and causing the temperature of the sensing element to reduce according to the curve segment 16 toward room temperature. The temperature of the sensing element thus cycles periodically having a fifty percent duty cycle (that is, the time during which the "ON" or "call for heat" signal is being generated). The overall cycle time is ten minutes so that the thermostat undergoes six complete cycles per hour.

Figure 1B:
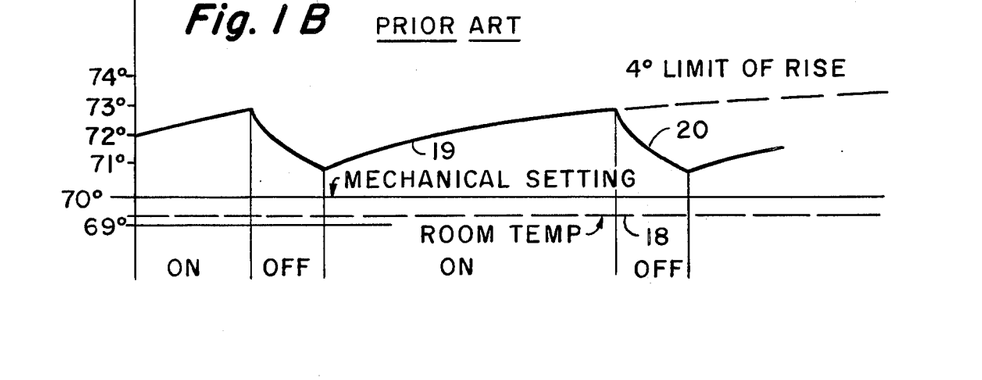

Referring now to FIG. 1B, if the room temperature decreases slightly, even less than one degree, as illustrated by the dashed line 18, it can be seen that the duty cycle increases dramatically, as indicated by the ON portion of the cycle, during which the temperature of the sensing element is rising along the curve segment 19. During the OFF portion of the cycle, the temperature of the sensing element decreases along the curve segment 20. In this example, the maximum temperature rise that can be effected by the heat anticipation resistor is 4° F. (i.e., the limits of the droop range). Thus, if the room temperature were to fall below 69° F., the thermostat would remain on continuously (in the case where no heat is supplied to the room) since the temperature of the sensing element would never be able to reach the upper trip point set at 73° F. In the example of FIG. 1B, the droop range and set points have remained the same, and the thermal time constants for the rise and fall of the temperature of the sensing element are also unchanged, but the loss of heat to the ambient has increased. FIGS. 1A and 1B illustrate typical operation for a conventional mechanical thermostat of the type used for room heating, for example, and having a heat anticipation resistor.

Figures 2, 5:
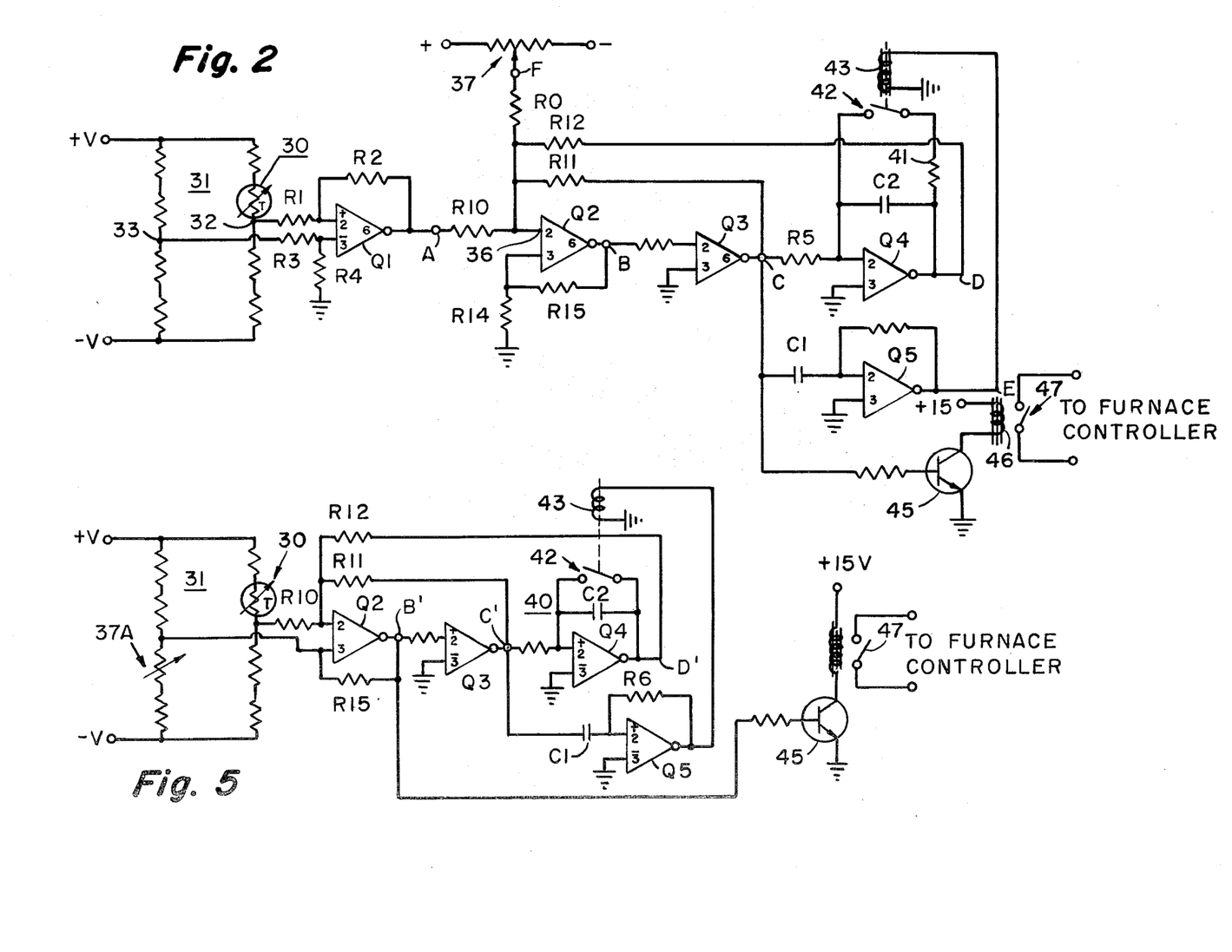
FIG. 2 is a circuit schematic diagram of a first embodiment of an electronic thermostat constructed according to the present invention.
FIG. 5 is a circuit schematic diagram of a second analog embodiment of an electronic thermostat incorporating the present invention.
Figure 3:
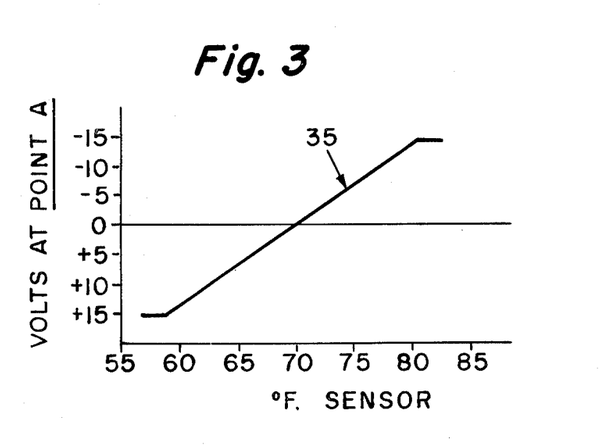
FIG. 3 is a graph showing the relationship between the temperature of the sensor and the signal which is inversely representative thereof.

Turning now to FIG. 2, there is shown a circuit diagram of a thermostat incorporating the present invention. A thermostat temperature sensing element designated 30 is connected in a bridge circuit 31, as illustrated. The temperature sensing element 30 in the illustrated embodiment has a negative temperature coefficient—that is, its resistance decreases as its temperature increases. Thus, the output signal at a node 32 of the bridge 31 increases as the temperature of the thermostat decreases. This signal is coupled through a resistor R1 to the negative or inverting input of a differential amplifier Q1, which is, in this embodiment, an inverting amplifier. A second output terminal 33 of the bridge circuit is used as a reference signal, and it is coupled through a resistor R3 to the positive or non-inverting input of the amplifier Q1. A resistor R2 is connected between the positive input of the amplifier and its output; and a resistor R4 is connected between ground and the negative input of the amplifier. The output of the amplifier Q1 is designated A. The circuitry thus far described generates a signal at point A which is inversely representative of the temperature of the sensor 30, as illustrated by the graph 35 in FIG. 3, where the abscissa is increasing temperature of the sensor, and the ordinate represents the inverted voltage at point A of the diagram of FIG. 2.

Returning then to FIG. 2, the signal at point A is fed through a resistor R10 to a summing junction designated 36 which is connected to the inverting input of a first inverting comparator Q2, the output of which is connected to the inverting input of a second inverting comparator Q3 having its non-inverting input referenced to ground. Resistor R15 is connected between the output terminal of comparator Q2 and its non-inverting input terminal which is referenced to ground through resistor R14, to provide regenerative feedback to avoid ambiguities around the switch point.

A second signal fed to the summing junction is from a set point potentiometer 37 which is connected between positive and negative supply voltages, and has its movable arm coupled through a resistor R13 to the summing junction 36. For purposes of reference, the arm is identified as point F, and it is a signal representative of a desired temperature setting, called the "set point". Although this set point is somewhat analogous to the mechanical setting of a conventional thermostat described above, it is not exactly the same. The mechanical setting of a conventional thermostat may be thought of as the lower limit of the droop range so that it has the effect of setting the trip points according to the hysteresis effect of the bimetal actuator. On the other hand, the set point here defines the middle of the droop range and there is no inherent hysteresis effect which separates the trip points.

A third signal fed to the summing junction 36 is coupled through a resistor R12 from an integrator generally designated 40. The integrator 40 includes a differential amplifier Q4 having its inverting input connected to the output of comparator Q3, and including an integrating capacitor C2 connected between its input and output terminal. The amplifier Q3 also is an inverting amplifier, and has its non-inverting input referenced to ground. The output of the amplifier Q4 is designated as terminal D, whereas the output of the comparator Q3 is designated C for reference purposes. Connected across the capacitor C2 for purposes of initializing it is a resistor 41 and a set of normally open contacts 42 which are actuated by means of a relay having a coil 43. The coil 43 of the relay is energized by a signal from an amplifier Q5 having its input connected by a capacitor C1 to the output of the comparator Q3. This signal is differentiated by capacitor C1 and amplified by amplifier Q5 for energizing the relay to close contacts 42, thereby discharging capacitor C2 through resistor 41 each time the comparator Q3 changes state.

A fourth signal fed to the summing junction is derived from the output of comparator Q3 and fed back through resistor R11. This is a positive feedback signal sometimes referred to as the "reinforcing" signal since one of its functions is to latch the comparators Q2 and Q3 once they have switched. The signal derives its polarity from the output signal and must be overcome (by the output of the integrator) before the comparators can switch again. Hence, it causes the circuit to have different thresholds for turning on and off. This causes it to exhibit a characteristic similar to the hysteresis of conventional bimetal elements.

The output of the comparator Q3 is used to actuate a transistor 45 having a coil 46 of a relay connected in its collector circuit. A pair of normally open contacts 47 are actuated by the relay 46, and connected to a furnace controller for energizing the furnace when closed.

The values of the resistors for the embodiment illustrated in FIG. 1 may be as set forth in Table I.

TABLE I

| R1 = 13.3 K ohm | R7 = 1 K ohm |
| R2 = 1 M ohm | R10 = 13.3 K ohm |
| R3 = 13 K ohm | R11 = .1 M ohm |
| R4 = 1 M ohm | R12 = 50 K ohm |
| R5 = 1 K ohm | R13 = 13.3 K ohm |
| R6 = .62 M ohm | |

With the circuit values set forth in Table I, the gain of point A relative to the summing junction is 7.5. The gain of point F is also 7.5. The gain of point D (the output of the integrator) is 2; and the gain of point C (the latching signal) is 1. In this regard, "gain" means the relative amount of current that will flow into (or out of) the summing junction for the same voltage increase.

From an observation of FIG. 2, it will be appreciated that there are four currents feeding the summing junction 36, namely, currents from nodes A, C, D and F; and the voltage at the summing junction is compared with zero volts so that the output of comparator Q2 is a minimum (=15 v.) when the sum of currents at the junction 36 is greater than zero, and it is a maximum (+15 v.) when the sum of the currents is less than zero. Comparator Q3 inverts the polarity of Q2.

Operation

Figure 4:
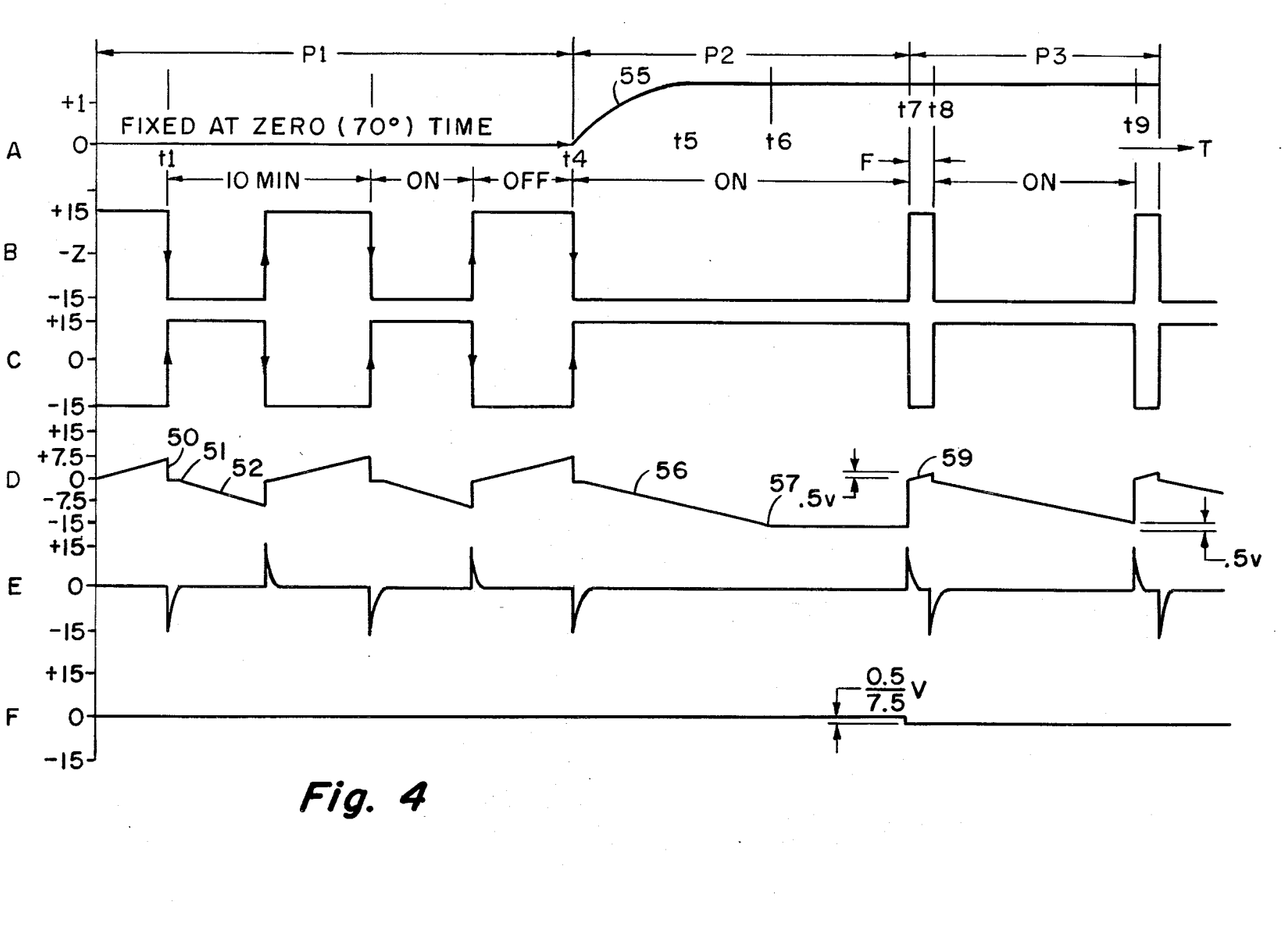
FIG. 4 is a timing diagram illustrating various voltages in the system of FIG. 2 under different conditions.

Referring to FIG. 4, the operation of the embodiment of FIG. 2 will be described. FIG. 4 is divided into three time periods designated P1, P2 and P3; and for each time period, the voltage waveforms at points A-F of the circuit are illustrated on correspondingly identified lines of FIG. 4.

During the time period P1, assuming that the temperature of the sensor 30 remains fixed at 70° F. (reference zero in the bridge circuit 31), and that the set point potentiometer 30 is also set to reference zero (70° F.), the voltage at the output of comparator Q2 is shown on line B. When it is positive the signal at C is inverted as shown at line C, so that the input of integrator 40 is negative, causing the output signal to rise as indicated on line D of FIG. 4. Because the gain at point F is the same as the gain at point A, but the senses are opposite, these signals will be offsetting in this example. The gain at D is twice the gain at C for currents into the summing junction, so when the signal at D exceeds +7.5 v., it will cause the sum of the currents at the summing junction 36 to equal zero, which will cause the comparators to switch rapidly due to the positive feedback, as seen at time $t_1$ in FIG. 4. In the example, for the period P1, it is assumed that no heat is added to the room. When the comparators switch, the current through resistor R11 reverses, thereby providing a step function (or latching current) which must be overcome or compensated by the output of the integrator before the comparison circuit means will switch again. As the output signal of comparator Q3 switches, a pulse is generated by amplifier Q5, as indicated at line E of the timing diagram to close contacts 42 for a time sufficient to discharge capacitor C2, thereby resetting the output signal of the integrator 40 to zero volts, as indicated by the signal portion 50 on line D of FIG. 4. When the switch 42 opens shortly thereafter, as indicated at point 51, the input to the integrator 40 is positive, so its output decreases along the portion 52 until it falls below −7.5 v., at which time, the sum of the currents at the summing junction becomes negative, again switching the comparators.

The circuitry continues in this cycle of operation as indicated in lines B and C as long as these input conditions prevail. The slope of the output of the integrator 40 (the slope of the line 52) determines the cycle time for the system, and in the illustrated embodiment, this is determined by the values of resistor R4 and capacitor C2. The time for a complete cycle is set to be approximately ten minutes as indicated in FIG. 4.

Turning now to the time period P2 of FIG. 4, it is assumed that the temperature of the sensor 30 decreases by an amount greater than two degrees. In this embodiment, the system will lock on if the temperature falls below the droop range, and it will lock off if the temperature rises above it. For example, the system will lock on if the temperature of the sensor is more than two degrees below the set point, or lock off if the temperature of the sensor is more than two degrees greater than the set point.

In this example, the temperature of the sensor 30 falls by an amount slightly greater than two degrees. The output of the amplifier Q1 increases along the curve 55 to a steady value. With this increase, comparator Q2 generates a steady low level, and comparator Q3 generates a steady high output level, as indicated at line C of FIG. 4. The output of the integrator 40 decreases steadily along the curve 56 until it reaches its negative maximum at 57 (−15 v.). In this example, because the gain of point A is 7.5, and because the output of the integrator 40 will be limited at −15 v., and the gain at point C is 2, the sum of the currents at the summing junction 36 will be greater than zero, and the output of the comparator circuit Q3 will be locked in its high state, thereby causing transistor 45 to conduct and contacts 47 to close. Under normal conditions of heating, the furnace would be turned on to increase the temperature of the sensor.

In time period P3, namely at time t7, the set point potentiometer 37 is reduced by 0.5/7.5 v. while the temperature of the sensor 30 remains the same as for period P2 (namely, the temperature of the sensor is reduced). Thus, the voltage at point A remains the same for the period P3 as it was in P2, as indicated by the curve 58. However, assuming that the voltage at point F is reduced as indicated above, and as illustrated on line F of FIG. 4 at the time t7, the sum of the currents at the summing junction 36 will be less than zero, and the comparators Q2, Q3 will switch states immediately. The current through R11 will reverse immediately to latch the output state. As already indicated, this signal causes a regenerative step-function feedback to the summing junction that must be overcome by the output of the integrator (assuming no change in room temperature or set point setting) before the comparator can change states again.

The output of the integrator 40 will be initialized to zero, and then begin to increase positively, as indicated by the segment 59 of the waveform on line D of FIG. 4 until it reaches +0.5 v. At this time, the sum of the currents into the junction 36 will again equal zero, and the comparators will switch. At this time, the voltage at point C goes to −15 v., so that the voltage at point D (the output of the integrator) must go to a −14.5 v. level before the sum of the current at the junction 36 becomes less than zero to cause the comparators to switch again. It will be appreciated that the ON duty cycle during the period P3 has increased substantially, but because of the reduction in the set point, the system is not locked on continuously. Again, during the period P3, it is assumed that no temperature rise is experienced by the sensor 30.

Embodiment of FIG. 5

Turning now to the embodiment of FIG. 5, circuit elements or components which are the same as those already discussed are repeated with like reference characters. For example, inverting comparators are designated Q2 and Q3; and they are connected in the same configuration. The principal change in the embodiment of FIG. 5 is that the set point generator is in the form of a variable resistor 37A connected in the opposite leg of the bridge 31 from the temperature sensing element 30. The temperature sensing element 30 in the embodiment of FIG. 5 also has a negative temperature coefficient. To increase the set point in the embodiment of FIG. 5, the resistance of the variable resistor 37A increases so as to increase the bridge output signal to the negative input of comparator Q2. Further, the adjustment of set point level acts to vary the reference level of the comparator Q2. It is the output of comparator Q2 which is taken as the signal to the transistor 45 for energizing the coil 46 of a relay having its contacts 57 connected to the furnace controller.

In operation, as the set point is raised by increasing the value of resistor 37A, the signal to the non-inverting input of comparator Q2 increases accordingly. When the voltage at the inverting input of the comparator Q2 exceeds that at the non-inverting input, its output at B will go negative, thereby causing transistor 45 to become non-conducting. As the temperature of the sensor 30 decreases, its resistance value increases, causing the signal at the inverting input of comparator Q2 to reduce. When the signal at the inverting input becomes less than the signal at the non-inverting input, the comparator will switch, causing its output at B′ to go positive, thereby energizing the coil 46 and closing contacts 47 to the furnace controller.

If the signals to the inputs of the comparator Q2 are approximately equal, and assuming that its output has switched negative, the output of comparator Q3 will go positive. This causes the output at C′ to go positive and provides a step-function latching current into the inverting input of Q2. It also causes a negative ramp voltage at the output of the integrator 40. This negative ramp eventually will cause the signal level at the inverting input of comparator Q2 to go negative relative to its non-inverting input, thereby switching the state of the comparator. Thus, the system of FIG. 5 has a principle of operation similar to that for the circuit of FIG. 2, but the circuit of FIG. 2 may be preferable because the gain of the set point circuitry is less in FIG. 5 because it is incorporated into the bridge 31. The values of corresponding circuit elements are not the same for the two embodiments.

In the embodiment of FIG. 2, the junction 36 is a summing means and the comparators Q2 and Q3 comprise comparison circuit means. In the embodiment of FIG. 5, comparator Q2 acts both as a circuit for combining the currents algebraically (i.e. summing) and for making the comparison.

In summary, the signals fed back through resistors R11 and R12 comprise a step signal (R11) which tends to latch that output signal, and a signal which increases in magnitude with time (via R12 and not necessarily linear) which is responsive to the state of the output signal but has a polarity tending to change that state.

Having thus described in detail alternative embodiments of an electronic thermostat with heat anticipation simulation, persons skilled in the art will be able to modify the circuitry which has been disclosed and to substitute equivalent components or elements for those described while continuing to practice the principle of the invention. For example, the comparison function can be accomplished mechanically using forces (electromagnetic, for example), and the latching can also be accomplished mechanically. It is, therefore, intended that all such modifications and substitutions be covered as they are embraced within the spirit and scope of the appended claims.

I claim:

1. Thermostat apparatus for generating an output signal for actuating a controller, comprising: temperature sensing circuit means generating an analog signal representative of temperature of a space to be affected by said controller; set point signal generator means for generating a set point signal representative of a desired temperature set point for said space; latching comparison means having first and second stable states and responsive to said temperature signal and said set point signal for generating said output signal in either an ON or an OFF state; first circuit means responsive to said output signal for generating a first signal increasing in magnitude with time and having a polarity to change the state of said output signal; said comparison means generating said ON signal when the magnitude of said set point signal exceeds the magnitude of said combined first signal and said temperature signal, and for generating said OFF signal when the magnitude of said set point signal is less than the magnitude of said combined first signal and said temperature signal.

2. The apparatus of claim 1 further comprising reset circuit means responsive to the switching of the output signal of said comparator circuit means for resetting said integrator circuit means to zero each time the output of said comparator circuit means changes.

3. The apparatus of claim 2 wherein said comparison means comprises comparison circuit means and said first circuit means includes means for generating a positive feedback signal for said comparison circuit means to thereby cause said comparison circuit means to have different thresholds for generating said ON and said OFF signals.

4. The apparatus of claim 3 wherein said comparison circuit means comprises a comparator circuit having binary output states, one of which represents said ON signal and the other of which represents said OFF signal, said first circuit means comprising integrator circuit means for generating said ramp signal having an increased magnitude in time and coupled to the input of said comparator circuit means, the polarity of said ramp signal tending to reverse the output state of said comparator circuit means.

5. The apparatus of claim 4 characterized in that said ramp signal is limited in magnitude between upper and lower levels such that when said set point signal exceeds said temperature signal by a predetermined amount, said apparatus will lock on until said temperature signal changes and when said set point signal is less than said temperature signal by a predetermined amount, said apparatus will lock off until said temperature signal changes.

6. The apparatus of claim 3 wherein said means for generating said positive feedback signal includes resistive circuit means coupling a signal from said output of said comparison circuit means to the input thereof for latching said comparison circuit means.

7. The apparatus of claim 5 wherein said comparison circuit means includes first and second input terminals, one of said input terminals being connected to a reference voltage and the other input terminal comprising a summing junction receiving said set point signal, said combined first signal and said temperature signal, whereby when the sum of said signals is less than said reference voltage, said comparator circuit generates said ON output signal, and when the sum of said signals is greater than said reference signal, said comparator circuit means generates said OFF output signal.

8. The apparatus of claim 2 wherein said temperature sensing means comprises a solid state element having a resistance characteristic varying with temperature.

9. The apparatus of claim 8 wherein said temperature sensing element has a negative temperature coefficient, said system further comprising bridge circuit means incorporating said temperature sensing element; and second comparison circuit means responsive to the output of said bridge circuit means for generating a temperature signal decreasing with increasing temperature sensed by said element.

10. The apparatus of claim 1 wherein said comparison means comprises latching comparator circuit means including a latching signal for latching said comparator in either state and having first and second input terminals for generating a binary output signal comprising said ON and OFF signals respectively, one of said input terminals of said comparator circuit means receiving said temperature signal and said first signal, and the other of said input terminals of said comparator circuit means receiving said set point signal and said reinforcing signal, whereby when the magnitude of said set point signal exceeds the combined magnitudes of said temperature signal and said first signal, said comparator circuit means is actuated to generate said OFF signal, and when the magnitude of said set point signal is less than the combined magnitudes of said temperature signal and said first signal, said comparator circuit means is actuated to generate said ON signal.

11. The apparatus of claim 10 wherein said first circuit means includes integrator circuit means responsive to the state of said output signal for generating a ramp signal increasing in time and having a polarity tending to reverse the effect of said latching signal; and further comprising reset circuit means for resetting said integrator circuit means when the output of said comparator circuit means changes.

12. The apparatus of claim 11 characterized in that the magnitude of said ramp signal is limited between upper and lower levels whereby if said set point signal exceeds said other signals by more than a predetermined amount, said comparator circuit means will be actuated to generate said ON output signal.

13. An electronic thermostat for generating an output signal to actuate a controller, comprising: comparison circuit means having first and second output states representative respectively of an ON state and an OFF state for said controller and having first and second input terminals, one of said input terminals comprising a summing junction and the other of said input terminals being connected to a reference voltage level; integrator circuit means responsive to the state of said output signal of said comparison circuit means for generating a ramp signal increasing in magnitude with time, said ramp signal being coupled to said summing junction and having a polarity tending to reverse the state of said comparison means; temperature sensing means for generating an analog signal representative of the temperature of a space to be affected by said controller; set point signal generator means for generating a signal representative of a desired set point for said space; means for coupling said temperature signal, said set point signal and said ramp signal to said summing junction, said comparison circuit means tending to generate said ON signal when the magnitude of said set point signal is greater than said temperature signal, said tending to generate said OFF signal when the magnitude of said set point signal is less than said temperature signal, said ramp signal tending to cycle said comparison circuit means when the magnitudes of said set point and temperature signals are equal; and reset circuit means responsive to a change of state in said output signal for resetting said integrator circuit means each time said comparison circuit means changes state.

14. The apparatus of claim 13 characterized in that said sensing element has a negative temperature coefficient and said temperature signal decreases with increasing temperature, and wherein said ramp signal is limited between predetermined limits such that if said temperature signal exceeds said set point signal by a predetermined amount, said comparison circuit means will be locked in the ON output state.

15. An electronic thermostat for generating an output signal for actuating a controller, comprising: comparison circuit means for generating an output signal in either an ON state or an OFF state depending upon whether the signal at a first input terminal is greater than or less than the signal at a second input terminal respectively; integrator circuit means responsive to the output state of said comparison circuit means for generating a ramp signal increasing in magnitude with time and connected to said first input terminal of said comparison circuit means and having a polarity to tend to reverse the state of said output signal of said comparison circuit means; step signal generating means for generating a step signal having a polarity representative of the output state of said comparison circuit means and having a polarity tending to reinforce said state; temperature sensing means for generating an analog signal representative of the temperature of a space to be affected by said controller; set point signal generator means for generating a signal representative of a desired set point for said space; means for combining said temperature signal with said ramp signal and said step signal and for coupling the combined signal to one of the terminals of said comparison circuit means and for coupling said set point signal to the other terminal of said comparison circuit means, whereby said comparison circuit means generates said ON signal when said set point signal is greater than the combined ramp signal, step signal and temperature signal, and for generating said OFF signal when said set point signal is less than said combined signals; and means responsive to the change of state of said comparison circuit means for resetting said integrator circuit means each time said comparison circuit means changes state.

16. The apparatus of claim 15 characterized in that said ramp signal is limited to a value such that when said set point signal exceeds said temperature signal by a predetermined amount, said comparison means is actuated to generate said ON signal.

* * * * *

UNITED STATES PATENT AND TRADEMARK OFFICE
CERTIFICATE OF CORRECTION

PATENT NO. : 4,254,906

DATED : March 10, 1981

INVENTOR(S) : Thomas E. Hayes

It is certified that error appears in the above—identified patent and that said Letters Patent is hereby corrected as shown below:

Column 10, line 42, "said" (second occurrence) should be -- and --.

*Signed and Sealed this*

*Twenty-sixth* Day of *May 1981*

[SEAL]

*Attest:*

RENE D. TEGTMEYER

*Attesting Officer*     *Acting Commissioner of Patents and Trademarks*